United States Patent [19]
Ishizawa

[11] Patent Number: 5,983,285
[45] Date of Patent: *Nov. 9, 1999

[54] DATA COMMUNICATION CONTROL APPARATUS AND METHOD FOR CONTROLLING DATE COMMUNICATION AMONG AT LEAST ONE DATA PROCESSING APPARATUS AND A PLURALITY OF DEVICES

[75] Inventor: Yasuhisa Ishizawa, Yokohama, Japan

[73] Assignee: Canon Kabushiki Kaisha, Tokyo, Japan

[*] Notice: This patent is subject to a terminal disclaimer.

[21] Appl. No.: 08/904,649

[22] Filed: Aug. 1, 1997

Related U.S. Application Data

[62] Division of application No. 08/306,734, Sep. 15, 1994, Pat. No. 5,701,512, which is a continuation of application No. 07/972,738, Nov. 6, 1992, abandoned, which is a continuation of application No. 07/524,711, May 21, 1990, abandoned, which is a continuation of application No. 07/022,016, Mar. 5, 1987, abandoned.

[30] Foreign Application Priority Data

Mar. 11, 1986 [JP] Japan ................................. 8-051568
Mar. 11, 1986 [JP] Japan ................................. 8-051569
Mar. 11, 1986 [JP] Japan ................................. 8-051570

[51] Int. Cl.$^6$ .................................................. G06F 13/12
[52] U.S. Cl. ................................. 710/1; 710/15; 710/17; 710/18

[58] Field of Search ................................. 395/800, 821, 395/835, 837, 838, 856, 725, 325, 275, 200; 710/1, 15, 17, 18

[56] References Cited

U.S. PATENT DOCUMENTS

| 4,191,997 | 3/1980 | Luiz | 395/728 |
| 4,313,161 | 1/1982 | Hardin et al. | 711/151 |
| 4,390,943 | 6/1983 | Twibell et al. | 395/871 |
| 4,590,549 | 5/1986 | Burrage et al. | 364/131 |
| 4,680,641 | 7/1987 | Nakazawa | 358/401 |
| 4,727,435 | 2/1988 | Otani et al. | 358/296 |
| 4,786,974 | 11/1988 | Ina | 358/257 |

Primary Examiner—Maria N. Vonbuhr
Attorney, Agent, or Firm—Fitzpatrick, Cella, Harper & Scinto

[57] ABSTRACT

A data communication control apparatus controls data communication between at least one data processor, a reader which reads an image and outputs image data, and a printer which prints an image in accordance with the input image data. A connection controller controls a connection between the data processor, the reader and the printer, and a detector detects a connection request from the data processor. A discriminator discriminates whether or not the reader and the printer are in a copying operation, and a notification unit notifies the data processor of predetermined information.

7 Claims, 3 Drawing Sheets

DATA COMMUNICATION CONTROL APPARATUS AND METHOD FOR CONTROLLING DATE COMMUNICATION AMONG AT LEAST ONE DATA PROCESSING APPARATUS AND A PLURALITY OF DEVICES

This application is a division of application Ser. No. 08/306,734 filed Sep. 15, 1994, now U.S. Pat. No. 5,701,512, issued Dec. 23, 1997, which is a continuation of application Ser. No. 07/972,738, filed Nov. 6, 1992, abandoned, which is a continuation of application Ser. No. 07/524,711, filed May 21, 1990, abandoned, which is a continuation of application Ser. No. 07/022,016, filed Mar. 5, 1987, abandoned.

BACKGROUND OF THE INVENTION

1. Field of the Invention

The present invention relates to a data control apparatus, and more particularly to a data transmission control apparatus in which input/output units are commonly used by plural central processing units.

2. Related Background Art

In conventional systems, for example an image processing system, each central processing unit (CPU) is often equipped with at least an image input unit such as an image reader or an image output unit such as an image printer. However, in such a system, the proportion of use of such image input/output units is quite low in the entire processing time of the system, and the connection of an expensive image input/output unit to each CPU is very inefficient. For this reason there has been proposed a system which is provided with a printer control unit, called a printer server, by means of which a printer unit is commonly utilized by plural CPU's through a local area network (LAN). However such a system involves a complicated LAN and common control and is not suitable for a small system.

SUMMARY OF THE INVENTION

In consideration of the foregoing an object of the present invention is to provide a data transmission control apparatus in which a data processing unit can be commonly utilized by plural central processing units and can therefore be effectively utilized.

Another object of the present invention is to provide a data transmission control apparatus in which a data processing unit connected to central processing units can be utilized not only in relation to said central processing units but also independently.

The foregoing and still other objects of the present invention, as well as the features and advantages thereof, will become fully apparent from the following description.

DETAILED DESCRIPTION OF THE PREFERRED EMBODIMENTS

Now the present invention will be clarified in detail by an embodiment shown in the attached drawings.

Figure 1:
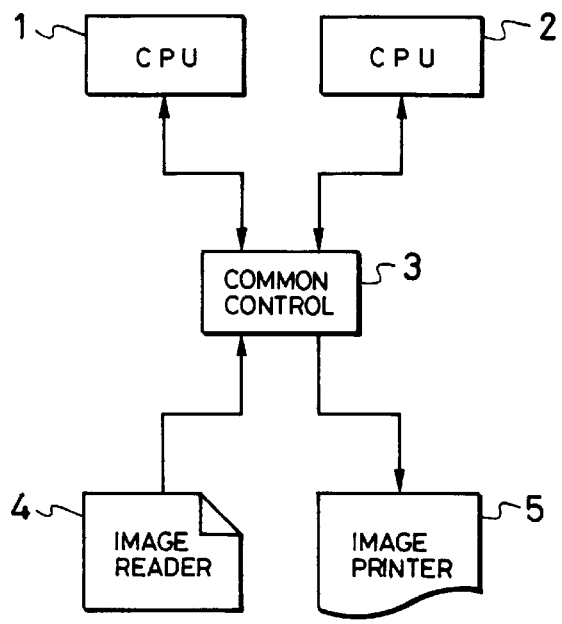
FIG. 1 is a block diagram of a common control unit embodying the present invention.

FIG. 1 is a block diagram showing an embodiment of the present invention, wherein central processing units (CPU) 1, 2 commonly have an image reader 4 and an image printer 5 through a common control unit 3. The CPU's 1, 2 are information processing units such as work stations, personal computers or word processors. The image reader 4 enters the reflected light from an original image through optical means, into a photoelectric converting element such as a CCD image sensor, and converts the entered light by said photoelectric converting element into image data consisting of serial electric signals representing the density of pixels.

The image printer 5 receives the image data consisting of serial electric signals and reproduces the image, in the form of a dot image, on a sheet. The image printer can be composed, for example, of a so-called laser beam printer in which a laser beam modulated according to the image data scans a photosensitive drum to form a latent image corresponding to the data, and the latent image is then developed and transferred to a reproducing means for are reproducing the image on a sheet, an electrostatic printer provided with electrostatic electrodes, an ink jet printer achieving a printing operation by the emission of ink droplets, or a thermal printer for image printing by thermal color development, including a thermal transfer printer.

The image reader 4 may be directly linked with the image printer 5 to function as a copying machine.

In response to a connection request from the CPU 1 or 2, the common control unit 3 connects the CPU with the image reader 4 or the image printer 5. Also, when none of the CPU's 1, 2 are connected to the image reader 4 or the image printer 5, the image reader 4 is automatically connected to the image printer 5 to function as a copying machine.

Figure 2:
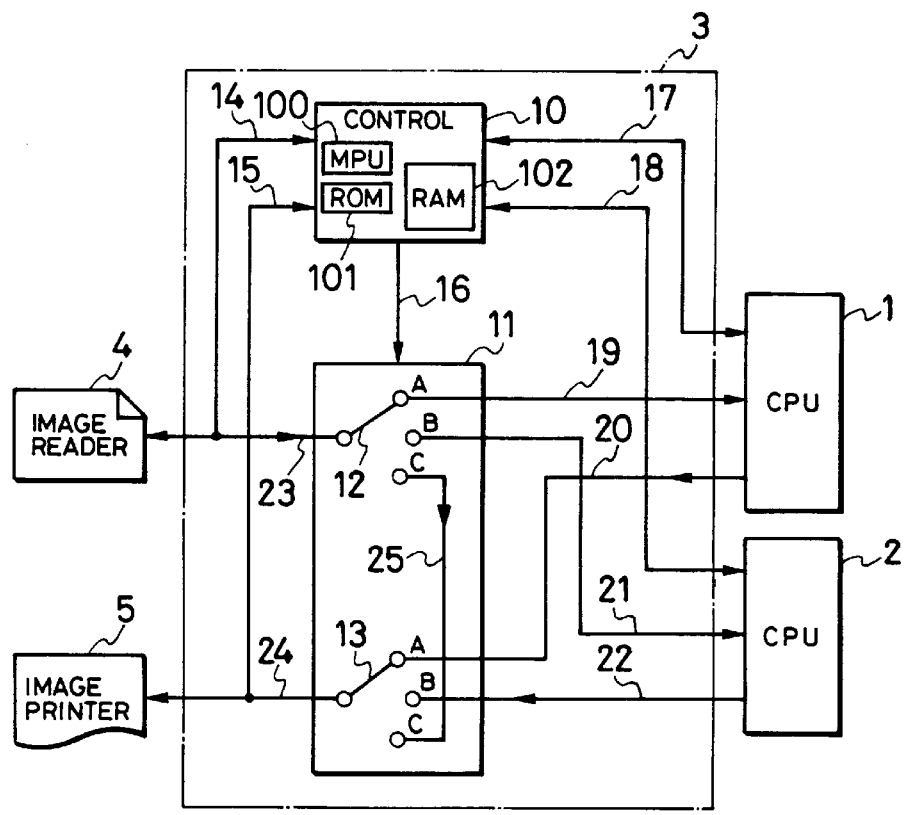
FIG. 2 is a circuiting diagram showing the connection of the common control unit of said embodiment.

FIG. 2 is a block diagram showing the structure of the common control unit 3.

A connection switch circuit 11 switches the connection between the image reader 4, image printer 5 and the CPU's 1, 2 according to a switching signal 16 from a control unit 10. Parts of interface signals of the image reader 4 and the image printer 5 are supplied as status signals to a control unit 10 through signal lines 14, 15, and the control unit 10 inspects the function status of the image reader 4 and the image printer 5 through the status signals.

The control unit 10, for controlling the common control unit 3 in response to the status signals and interface signals 17, 18, is provided with a microprocessor (MPU) 100, a ROM 101 storing control programs and data therefor, and a RAM 102 serving as a working area.

The control signals 17, 18, supplied to the control unit 10 for common control respectively from the CPU 1 and CPU 2, are transmitted in the form of serial data. There are also shown image reader interface signals 19, 21 respectively of the CPU 1 and CPU 2, and image printer interface signals 20, 22 respectively of the CPU 1 and CPU 2. Switches 12, 13 in the connection switch circuit 11 are mutually linked and select the contacts A, B or C in response to the switch signal 16 from the control unit 10, thus controlling the connection between the CPU's and the image reader 4 and image printer 5. The switches 12, 13 are composed of logic circuits.

The image reader interface signal 23 and the image printer interface signal 24 are composed of communication signals for exchanging commands and status messages and image signals for entering or releasing image data, and the direction of input or output of the image signals is mutually inverse between the image reader interface signal 23 and the image printer interface signal 24.

In the function as a copying machine, the image reader 4 assumes a mode of directly controlling the image printer 5, called an off-line mode. In this state the switches 12, 13 are switched to the contacts C in response to the switch signal 16 from the control unit 10, whereby the image reader interface signal 23 and the image printer interface signal 24 are exchanged between the image reader 4 and the image printer 5, through a signal line 25.

If a copy start key of the image reader 4 is actuated for example in the off-line mode, the image reader 4 starts image reading and supplies the image printer 5 with image data for executing a printing operation, whereby a copying operation as a copying machine is achieved.

On the other hand, when connected to either of the CPU1 and CPU2, the image reader 4 and the image printer 5 function in a slave mode to achieve a reading operation or a printing operation under the control of the CPU 1 or CPU2. This mode is called an on-line mode.

The on-line mode or the off-line mode in the image reader 4 can be selected by an on-line command or an off-line command supplied thereto, in the form of communication signals of the image reader interface signal 23, from the control unit 10 through the signal line 14.

The interface signals 17, 18 are the well known serial interface signals, called RS232C, by means of which the control unit 10 exchanges commands and status messages for common control with the CPU's 1 and 2. When the CPU 1 wishes to use the image printer 5, it checks the status of the common control unit 3 through the interface signal 17, and, if the image printer 5 is available, it releases an open command to request exclusive use of the image printer 5 by the CPU 1. When the exclusive use state is established by the reception of the open command, the CPU 1 performs a printing operation with the image printer 5, and, after the completion of the printing operation, it releases a close command to declare the end of such exclusive state, thereby terminating the control sequence.

The switching of the connection switch circuit 11 by the control unit 10 is prohibited in certain states of the image reader 4 and the image printer 5. Such prohibition takes places firstly when the image reader 4 or the image printer 5 is exclusively used by the CPU1 or CPU2, namely in a period from the reception of an open command to the reception of a close command from the CPU, and secondly in the off-line mode, or in a local copying mode, in which the image reader 4 and the image printer 5 function as a copying machine though neither is exclusively used by either CPU. For this purpose the control unit 10 has to detect a copying operation in progress, by monitoring the communication signals of the image reader interface signal 23, thereby inspecting the communication between the image reader 4 and the image printer 5.

The copying sequence is conducted in the following manner. A copy preparation stage consists of rotating a photosensitive drum of the image printer 5, and supplying a recording sheet to a predetermined position from a cassette when said drum reaches a predetermined revolution.

Then the copying operation is conducted by synchronizing the reading operation of the image reader 4 with the printing operation of the image printer 5. After the sheet with a copied image is discharged, the image printer 5 terminates the rotation of the photosensitive drum, and checks the presence of abnormalities such as sheet jamming, thereby completing the copying sequence. Thus the control unit 10 monitors the communication between the image reader 4 and the image printer 5, and determines a switching prohibition period by detecting the period from a command for starting the rotation of the photosensitive drum to an end status signal following a command for stopping the rotation of the drum.

In the communication signals of the image reader interface signal 23 and the image printer interface signal 24, each command is always responded to by a status signal from the recipient of the command signal. Thus the switching is naturally prohibited in a period from the sending of the command signal to the return of the status signal.

Figure 3:
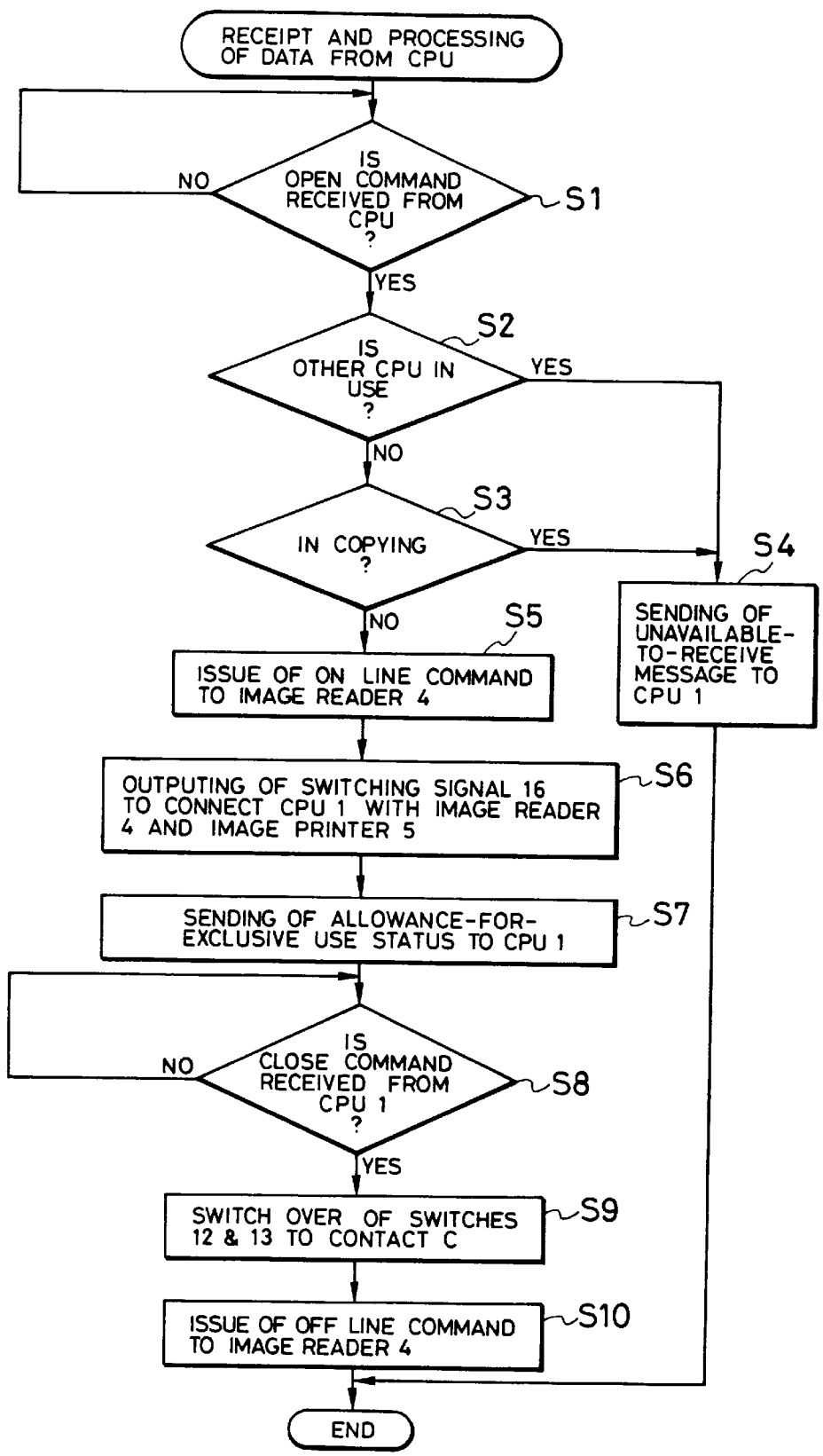
FIG. 3 is a flow chart showing the receiving operation of a control unit.

FIG. 3 is a flow chart of a sequence, stored in the ROM 101 of the control unit 10 of the common control unit 3, for receiving signals from the CPU of the MPU 100.

At first, if a step S1 discriminates the reception of an open command, requesting the exclusive use of the image reader 4 or the image printer 5, from the CPU1 or the CPU2, the program proceeds to a step S2 for inspecting the state of use of other CPU's. In the following there will be explained the function of the MPU 100, in case an open command is received from the CPU1. In response to an open command from the CPU1, and, if the CPU2 is not in use, the program proceeds to a step S3 for inspecting whether the image reader 4 and the image printer 5 are in a copying operation in the off-line mode. If a copying operation is in progress, or if the step S2 identifies that the CPU 2 is occupied, the program proceeds to a step S4 to send an unavailable-for-receiving message to the CPU1.

In the so-called off-line mode in which no CPU is in use, and no copying operation is in progress, so that the image reader and the image printer 5 are available, a step S5 sends an on-line command to the image reader 4 to shift the mode to the on-line mode.

A step S6 releases a switch signal 16 to shift the switches 12, 13 to the contacts A, in order to connect the CPU 1 with the image reader 4 and the image printer 5, and a step S7 sends a status signal indicating the exclusive use to the CPU 1, whereby a state of exclusive use by the CPU 1 is established.

A step S8 discriminates whether a close command, indicating the end of the exclusive use, has been received from the CPU 1, and, if received, the program proceeds to a step S9 to shift the switches 12, 13 to contacts C by the switching signal 16. A step S10 sends an off-line command to the image reader 4, thus shifting the same from the on-line mode to the off-line mode, thus realizing a stand-by state.

Figure 4:
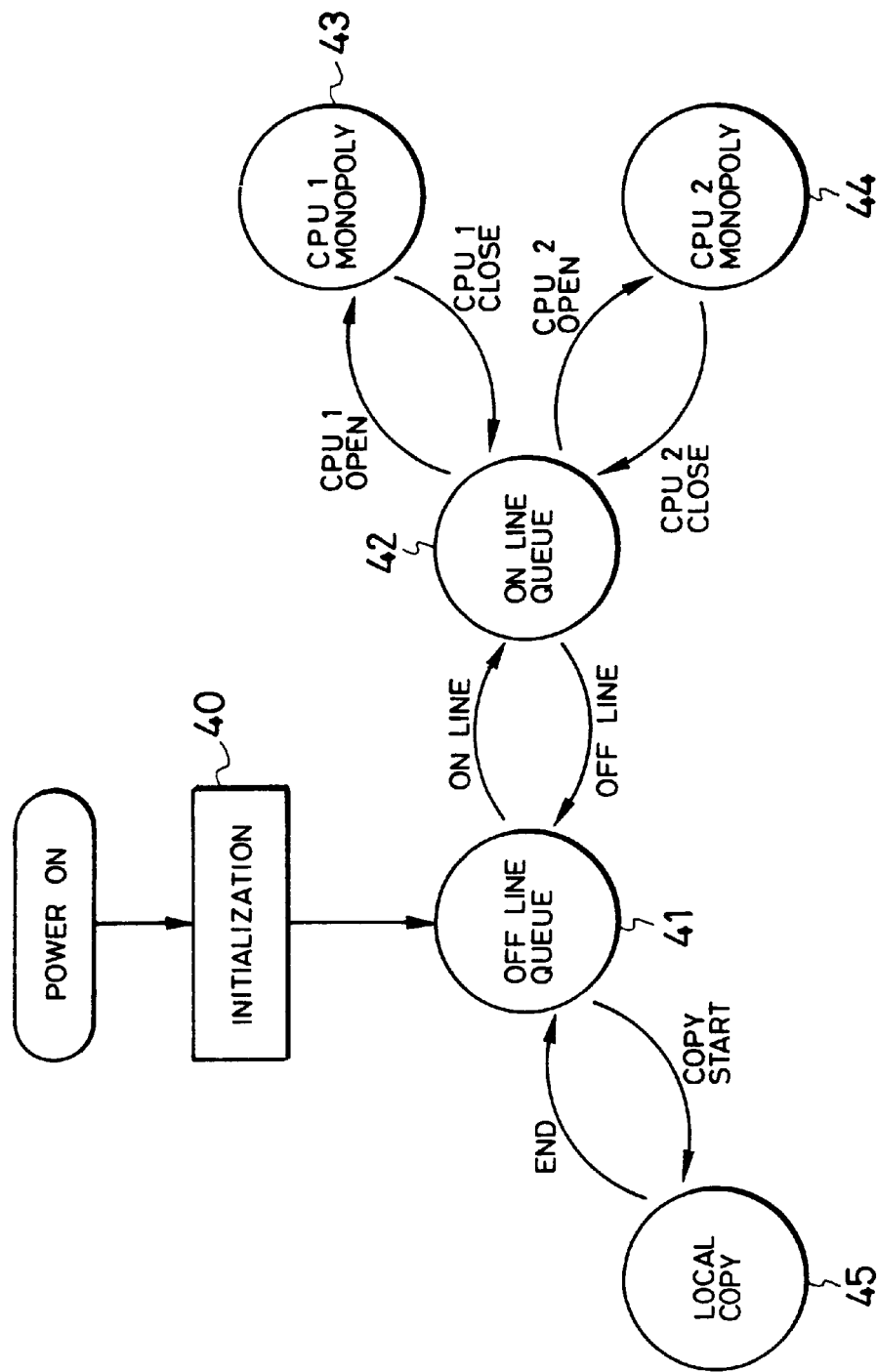
FIG. 4 is an explanatory chart showing various states of the common control unit.

FIG. 4 is an explanatory chart indicating the change of state of the image reader 4, image printer 5 and common control unit 3.

After the start of the power supply, a predetermined initialization is conducted in a state 40, and there is then assumed an off-line stand-by state 41. Then, in response to an open command, requesting exclusive use, from the CPU 1 or CPU 2, an on-line command is sent to the image reader 4 whereby an on-line mode 42 is assumed. Then, in response to an open command from the CPU 1 or CPU 2, a state 43 of exclusive use by the CPU 1 or a state 44 of exclusive use by the CPU 2 is assumed.

Then, in response to a close command from the CPU 1 or CPU 2, the apparatus shifts from the exclusive use state by the CPU 1 or CPU 2 to the on-line stand-by state 42, and it then moves to the off-line stand-by state 41 by the automatic sending of an off-line command to the image reader 4.

If an unrepresented copy start key of the image reader 4 is depressed by the operator during the off-line stand-by state, the apparatus shifts to a local copy mode 45 for a copying operation. After the completion of the copying operation, the off-line stand-by state 41 is again assumed.

In the present embodiment the number of CPU's is not limited to two, and can be arbitrarily varied.

The serial interface signal for common control is not limited to the format RS232C, and but can be replaced by another serial interface signal or a parallel interface signal.

Also the connection switch circuit 11 simultaneously switches the image reader interface signal and the image printer interface signal to a same CPU, and it may switch the signals to different CPU's at different timings.

In this manner the present invention can be modified in various manners within the scope and spirit thereof.

In the foregoing explanation the input and output units are explained as an image reader and an image printer, but they are not limited to such examples and can for example be other input/output units such as an image file capable of accumulating a large amount of image information, a communication unit to be connected to a communication line for transmission of information, or a display unit for displaying an image according to image information. Also the number of such input/output units can be arbitrarily increased or decreased.

As explained in the foregoing, the present embodiment allows plural central processing units to commonly use image input/output units without modifying the interface signal thereof.

Also, when not connected to the central processing units, the image input and output units can be mutually connected to achieve a function as a copying machine, thereby enabling effective utilization of such units.

The present invention is not limited to the foregoing embodiments, and is subject to various modifications and variations within the scope and spirit of the appended claims.

I claim:

1. A data communication control method of controlling data communication among at least one data processing apparatus, a reader which reads an image and outputs image data, and a printer which prints an image in accordance with the input image data, comprising:

a connection control step of controlling a connection among the data processing apparatus, the reader and the printer;

a detection step of detecting a connection request from the data processing apparatus;

a discrimination step of discriminating whether or not the reader and the printer are in a copying operation; and a notification step of notifying the data processing apparatus of predetermined information, wherein said connection control step performs controlling such that a condition in which the reader and the printer instantly start the copying operation is set during a stand-by period, wherein, in a case where said detection step detects the connection request from the data processing apparatus, said connection control step performs controlling such that the data processing apparatus and the reader are connected to each other if said discrimination step discriminates that the reader and the printer are not in the copying operation, and wherein, in the case where said detection step detects the connection request from the data processing apparatus, said notification step notifies the data processing apparatus of information representing unavailable-to-receive if said discrimination step discriminates that the reader and the printer are in the copying operation.

2. A method according to claim 1, wherein the data processing apparatus is a work station, a personal computer or a word processor.

3. A method according to claim 1, further comprising a connection releasing detection step of detecting a connection releasing request from the data processing apparatus, and wherein said connection control step performs controlling such that the reader and the printer are connected to each other, until both the connection request from the data processing apparatus is detected and after the connection releasing request is detected.

4. A method according to claim 1, wherein the reader has a master mode for controlling the printer and a slave mode controlled by the data processing apparatus, and said connection control step performs controlling such that the reader operates in the master mode during the stand-by period and that the reader operates in the slave mode according to the connection request from the data processing apparatus.

5. A data communication control method of controlling data communication among at least one data processing apparatus, a reader which reads an image and outputs image data, and a printer which prints an image in accordance with the input image data, comprising:

a connection control step of controlling a connection among the data processing apparatus, the reader and the printer;

a detection step of detecting a connection request from the data processing apparatus;

a discrimination step of discriminating whether or not the reader and the printer are in a copying operation; and a notification step of notifying the data processing apparatus of predetermined information, wherein said connection control step performs controlling such that a condition in which the reader and the printer instantly start the copying operation is set during a stand-by period, wherein, in a case where said detection step detects the connection request from the data processing apparatus, said connection control step performs controlling such that the data processing apparatus and the printer are connected to each other if said discrimination step discriminates that the reader and the printer are not in the copying operation, and wherein, in the case where said detection step detects the connection request from the data processing apparatus, said notification step notifies the data processing apparatus of information representing unavailable-to-receive if said discrimination step discriminates that the reader and the printer are in the copying operation.

6. A method according to claim 5, wherein the data processing apparatus is a work station, a personal computer or a word processor.

7. A method according to claim 5, further comprising a connection releasing detection step of detecting a connection releasing request from the data processing apparatus, and wherein said connection control step performs controlling such that the reader and the printer are connected to each other, until both the connection request from the data processing apparatus is detected and after the connection releasing request is detected.

* * * * *

UNITED STATES PATENT AND TRADEMARK OFFICE
CERTIFICATE OF CORRECTION

PATENT NO. : 5,983,285  Page 1 of 1
DATED : November 9, 1999
INVENTOR(S) : Yasuhisa Ishizawa It is certified that error appears in the above-identified patent and that said Letters Patent is hereby corrected as shown below:

Title Page:
Item [54] in the Title: "DATE" should read -- DATA --.

Column 1:
Line 3, "DATE" should read -- DATA --; and
Line 35, "However" should read -- However, --.

Column 2,
Line 19, "are" should be deleted.

Column 3:
Line 40, "places" should read -- place --.

Column 4:
Line 18, "following" should read -- following, --.

Column 5:
Line 6, "but" should be deleted.

Signed and Sealed this

Twenty-first Day of August, 2001

Attest:

NICHOLAS P. GODICI
Attesting Officer   Acting Director of the United States Patent and Trademark Office